United States Patent
Kuo

(10) Patent No.: US 8,060,137 B2
(45) Date of Patent: Nov. 15, 2011

(54) COMMUNICATION APPARATUS AND METHOD

(75) Inventor: Chih-Yuan Kuo, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 467 days.

(21) Appl. No.: 12/407,792

(22) Filed: Mar. 20, 2009

(65) Prior Publication Data

US 2009/0239578 A1 Sep. 24, 2009

(30) Foreign Application Priority Data

Mar. 21, 2008 (CN) .......................... 2008 1 0300664

(51) Int. Cl.
*H04M 1/00* (2006.01)

(52) U.S. Cl. ................ 455/556.1; 455/404.1; 340/573.1

(58) Field of Classification Search ............... 455/404.1, 455/404.2, 410, 412.1, 412.2, 556.1, 556.2, 455/521, 567; 340/540, 573.1
See application file for complete search history.

(56) References Cited

U.S. PATENT DOCUMENTS

| 7,228,121 B2 | 6/2007 | Kennedy | |
|---|---|---|---|
| 2003/0022684 A1 * | 1/2003 | Seeger | 455/521 |
| 2004/0103158 A1 * | 5/2004 | Vella et al. | 709/206 |

* cited by examiner

Primary Examiner — Don Le
(74) Attorney, Agent, or Firm — Altis Law Group, Inc.

(57) ABSTRACT

A communication apparatus includes a communication unit, an operation unit, and a recording unit. The communication unit is for communicating with other communication apparatuses. The operation unit is for generating an operation signal corresponding to a user's operation. The recording unit is for recording immediate environmental sound and generating an audio file. The audio file is sent to the other communication apparatuses when the communication unit receives an incoming call from the other communication apparatuses and the operation unit does not receive a user's operation responding to the incoming call. A communication method is also provided.

10 Claims, 2 Drawing Sheets

COMMUNICATION APPARATUS AND METHOD

BACKGROUND

1. Technical Field

The present disclosure generally relates to communication apparatuses and methods, and particularly relates to a mobile phone and its communication method.

2. Description of Related Art

Mobile phones are ubiquitous because of their usefulness and portability. Mobile phones can be used in emergency, such as contacting the police or ambulance, or in non-emergency situations such as chatting with a friend or family member. However, in some cases, a person may not be able to answer his phone or to make an outgoing call, such at when the person is being robbed at gunpoint or other similar situations.

Therefore, a communication apparatus and method is needed in the industry to address the aforementioned deficiency.

DETAILED DESCRIPTION

Figure 1:
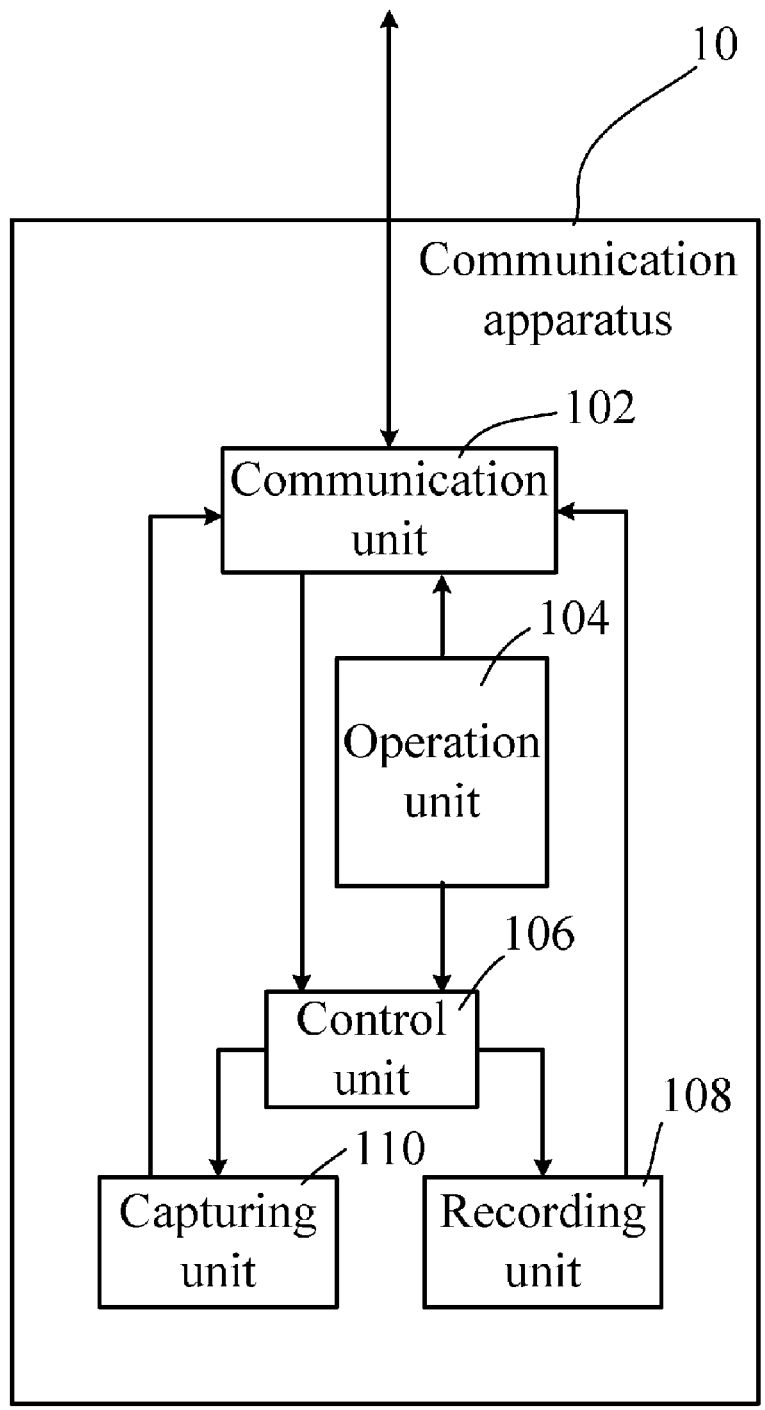
FIG. 1 is a schematic block diagram showing a communication apparatus in accordance with an exemplary embodiment.

Referring to FIG. 1, a communication apparatus 10 in accordance with an exemplary embodiment is illustrated with its functional modules. The communication apparatus 10, which in practice may be a mobile phone or a landline phone, includes a communication unit 102, an operation unit 104, a control unit 106, a recording unit 108, and a capturing unit 110.

The communication unit 102 is a module that allows communication with other communication apparatuses. The operation unit 104 responds to a user's operations, such as answering or hanging up the phone, and generates corresponding operation signals. The control unit 106 detects whether the user responds to an incoming call received by the communication unit 102, and starts the recording unit 108 and the capturing unit 110 when the incoming call goes unanswered. The recording unit 108 records the sound of the immediate environment and generates an audio file. The capturing unit 110 captures images of the immediate environment and generates a video file. The communication unit 102 sends the audio and video file to the other communication apparatuses.

Therefore, if a person is in a dangerous situation and he or she cannot answer the phone, the communication unit 102 will record sound and images automatically, and send this information to the caller.

Figure 2:
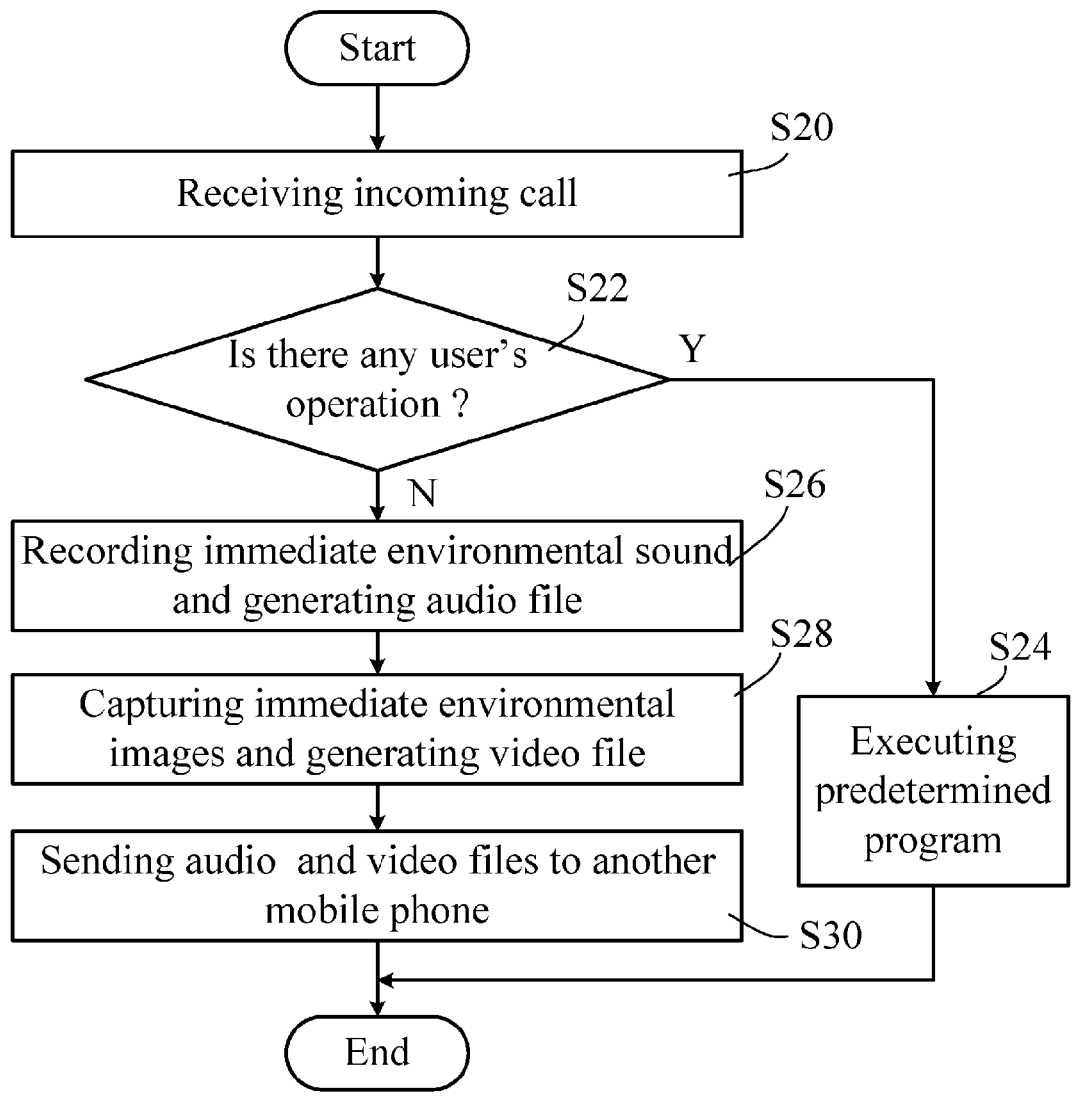
FIG. 2 is a flowchart showing a communication method in accordance with an exemplary embodiment.

Referring to FIG. 2, a flowchart of a communication method is illustrated to help a person in special situations.

In step S20, a communication apparatus such as the communication apparatus 10, possessed by a user receives an incoming call from another communication apparatus.

In step S22, the communication apparatus detects whether the user responds to the incoming call. If yes, step S24 is next, if no, step S26 is next.

In step S24, the communication apparatus executes a predetermined program corresponding to the user response.

In step S26, the communication apparatus records immediate environmental sound and generates an audio file.

In step S28, the communication apparatus captures immediate environmental images and generates a video file.

In step S30, the communication apparatus sends the audio and video files to the other communication apparatus.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A communication apparatus comprising:
   a communication unit for communicating with other communication apparatuses;
   an operation unit for generating an operation signal corresponding to a user's operation; and
   a recording unit for recording immediate environmental sound and generating an audio file;
   wherein the audio file is sent to the other communication apparatuses when the communication unit receives an incoming call from the other communication apparatuses and the operation unit does not receive a user's operation.

2. The communication apparatus according to claim 1, further comprising a capturing unit for capturing immediate environmental images and generating a video file to be sent to the other communication apparatuses.

3. The communication apparatus according to claim 2, further comprising a control unit for starting the recording unit and the capturing unit when the communication unit receives an incoming call from the other communication apparatuses and the operation unit does not receive a user's operation.

4. A communication apparatus comprising:
   a communication unit for communicating with other communication apparatuses;
   an operation unit for generating an operation signal corresponding to a user's operation; and
   a capturing unit for capturing immediate environmental images and generating a video file;
   wherein the video file is sent to the other communication apparatuses when the communication unit receives an incoming call from the other communication apparatuses and the operation unit does not receive a user's operation.

5. The communication apparatus according to claim 4, further comprising recording unit for recording immediate environmental sound and generating an audio file to be sent to the other communication apparatuses.

6. The communication apparatus according to claim 5, further comprising a control unit for starting the recording unit and the capturing unit when the communication unit receives an incoming call from the other communication apparatuses and the operation unit does not receive a user's operation.

7. A communication method comprising:
   receiving an incoming call from a communication apparatus;
   recording immediate environmental sound if there is no user's operation responding to the incoming call;
   generating an audio file; and
   sending the audio file to the communication apparatus.

8. The communication method according to claim 7, further comprising:
   detecting whether there is a user's operation responding to the incoming call.

9. The communication method according to claim 8, further comprising:
   executing a predetermined program corresponding to the response.

10. The communication method according to claim 7, further comprising:
   capturing immediate environmental images if there is no user's operation responding to the incoming call;
   generating a video file;
   sending the video file to the communication apparatus.

* * * * *